United States Patent
Watanabe

(10) Patent No.: US 8,746,868 B2
(45) Date of Patent: Jun. 10, 2014

(54) OILY INK AND METHOD OF INKJET PRINTING

(75) Inventor: Yoshifumi Watanabe, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 374 days.

(21) Appl. No.: 13/355,625

(22) Filed: Jan. 23, 2012

(65) Prior Publication Data

US 2012/0188306 A1    Jul. 26, 2012

(30) Foreign Application Priority Data

Jan. 25, 2011 (JP) ................. P2011-013054

(51) Int. Cl.
*B41J 2/01* (2006.01)
(52) U.S. Cl.
USPC ........................................... 347/100
(58) Field of Classification Search
USPC ........................................... 347/100
See application file for complete search history.

(56) References Cited

U.S. PATENT DOCUMENTS

| | | | |
|---|---|---|---|
| 2006/0214972 A1* | 9/2006 | Tajika et al. | 347/15 |
| 2009/0029049 A1 | 1/2009 | Furuhata et al. | |
| 2009/0246484 A1* | 10/2009 | Kumagai et al. | 428/201 |
| 2011/0046298 A1 | 2/2011 | Hosoya et al. | |

FOREIGN PATENT DOCUMENTS

| | | |
|---|---|---|
| JP | 2001311023 A | 9/2001 |
| JP | 2008239790 A | 9/2008 |
| JP | 2010001452 A | 7/2010 |

\* cited by examiner

*Primary Examiner* — Laura Martin
(74) *Attorney, Agent, or Firm* — Nath, Goldberg & Meyer; Jerald L. Meyer

(57) ABSTRACT

An oily ink including a pigment, a pigment dispersant, and an organic solvent, the oily ink further including 0.5 to 7% by mass of resin particles, which are swollen by the organic solvent, wherein
(1) a dispersion of 1% by mass of the resin particles in an equilibrium state of swelling in the organic solvent has an optical transmittance at 700 nm ranging from 20 to 70%, and
(2) a dispersion of 10% by mass of the resin particles in an equilibrium state of swelling in the organic solvent has such a viscosity that a ratio of the viscosity to a viscosity of the organic solvent ranging from 1.5 to 5.0. The oily ink form dense printed images on plain paper.

5 Claims, No Drawings

OILY INK AND METHOD OF INKJET PRINTING

CROSS REFERENCE TO RELATED APPLICATION

This Application is based upon and claims the benefit of priority from Japanese Patent Applications No. 2011-013054 filed on Jan. 25, 2011, the entire contents of which are incorporated by reference herein.

FIELD OF THE INVENTION

The present invention relates to an oily ink and a method of inkjet printing, specifically to an oily ink comprising resin particles in swollen state with an organic solvent, and to a method of inkjet printing using the oily ink. The swollen resin particles can fill pores of paper to prevent strike-through from occurring.

BACKGROUND OF THE INVENTION

An oily ink, hereinafter may simply be referred to as "ink", has advantages that it does not cause curling of printing paper, and that it allows a shorter period of drying time. However, it shows a problem of so-called "strike-through" of the ink caused by a pigment penetrate into paper together with a solvent, reducing density of printed images.

To solve this problem, the patent publication 1 proposes a method of incorporating inorganic fine particles in an oily ink to fill pores of paper by the inorganic fine particles, and the patent publication 2 proposes a method of dispersing a resin having a polar group in a non-aqueous solvent. However, in the former method, the effect of filling pores of paper is limited because the fine particles should have such a particle size that they do not plug a nozzle of an inkjet head. The latter method requires preparing the specific resin.

Meanwhile, an inkjet ink comprising resin particles in a non-aqueous solvent is known from the patent publication 3. The resin forms a film in a process of drying at a temperature of 120° C. to encapsulate pigments, resulting in an improved fixing and weather resistance of the ink. However, a satisfactory prevention of strike-through is not achieved.

PRIOR ART DOCUMENT

Patent Publication

[Patent publication 1] Japanese Patent Application Laid-Open No. 2008-239790
[Patent publication 2] Japanese Patent Application Laid-Open No. 2010-001452
[Patent publication 3] Japanese Patent Application Laid-Open No. 2001-311023

SUMMARY OF THE INVENTION

Problems to be Solved by the Invention

An object of the present invention is to provide an oily ink and a method of inkjet printing that can form dense images on plain paper without incurring strike-through and the aforesaid drawbacks of the prior methods.

Means to Solve the Problems

Thus, the present invention is an oily ink comprising a pigment, a pigment dispersant, and an organic solvent, the oily ink further comprising 0.5 to 7% by mass, relative to a mass of the oily ink, of resin particles, which are swollen by the organic solvent, wherein
(1) a dispersion of 1% by mass of the resin particles in an equilibrium state of swelling in the organic solvent has an optical transmittance at 700 nm ranging from 20 to 70%, and
(2) a dispersion of 10% by mass of the resin particles in an equilibrium state of swelling in the organic solvent has such a viscosity that a ratio of the viscosity to a viscosity of the organic solvent ranging from 1.5 to 5.0.

Another aspect of the present invention is a method of inkjet printing comprising the steps of
(I) ejecting one of the following oily ink (A) and oily ink (B):
the oily ink (A) according to the aforesaid present invention,
an oily ink (B) consisting of a pigment, a pigment dispersant, and an organic solvent,
wherein one of the oily ink (A) and the oily ink (B) comprises a black pigment and the other comprises a color pigment; and
(II) ejecting the other oily ink so as to overprint an image produced in the step (I).

Effects of the Invention

In the ink of the present invention, the resin particles present in such a state that they are swollen with the organic solvent to a predetermined extent. The swollen particles can plug pores of paper without prohibiting ejection of the ink. In addition, such plugging does not require heating after printing. The method of inkjet printing of the present invention can form denser images by combining the resin particles in the oily ink (A) with the oily ink (B) on a surface of paper to allow more of the pigment in the oily ink (B) remain on the surface of the paper, preventing strike-through.

DETAILED DESCRIPTION OF THE PREFERRED EMBODIMENTS

The present ink is characterized by comprising the combination of resin particles and an organic solvent meeting the following requirements:
(1) A dispersion of 1% by mass of the resin particles in an equilibrium state of swelling in the organic solvent has an optical transmittance at 700 nm ranging from 20 to 70%, and
(2) A dispersion of 10% by mass of the resin particles in an equilibrium state of swelling in the organic solvent has such a viscosity that a ratio of the viscosity to a viscosity of the organic solvent ranging from 1.5 to 5.0.
These requirements define a degree of swelling of the resin particles.

In the above (1) and (2), the equilibrium state of swelling can be confirmed by mixing resin particles with an organic solvent, leaving the mixture thus obtained standing still, and then monitoring light transmittance as well as viscosity of the mixture at a predetermined time interval until the light transmittance and viscosity reach constant values.

A period of time required for reaching an equilibrium state is usually 1 to 6 hours at room temperature, though it varies depending on the combination of a resin and an organic solvent used. Here, a mixture of two or more organic solvents can be used and a mixture of two or more kinds of resin particles can be used.

The light transmittance at 700 nm, hereinafter referred to as "light transmittance", may be measured on a resin particle dispersion placed in a quartz cell with an optical path length of 1 cm by using a spectrophotometer with an empty quartz cell as a reference. The viscosity is measured at 10 Pa using a cone plate type viscometer at 23° C. by raising a shear stress from 0 Pa to 10 Pa at a rate of 0.1 Pa/s. An ink having a light transmittance as defined in (1) smaller than 20%, or an ink having a viscosity ratio as defined in (2), hereinafter referred to as "viscosity ratio", larger than 5.0, would show inferior property of ejection from an inkjet head. On the other hand, an ink having a light transmittance above 70%, or an ink having a viscosity ratio below 1.5 would not achieve desired prevention of strike-through and improvement in printed image density. Preferably, the light transmittance is in the range of from 30 to 60%, and the viscosity ratio is in the range of from 1.5 to 3.

The resin particle can be of any material as far as the above requirements (1) and (2) can be met. Examples of the material include crosslinked acrylic resins, styrene/acrylic copolymer resins, styrene/divinyl benzene copolymer resins, and polyolefin resins, and those sold under the trade names of "Fine Sphere" from Nipponpaint Co., and "Techpolymer" from Sekisui Plastic Co. can be used.

The resin particles have an average particle size of from 50 to 300 nm, preferably from 50 to 200 nm, when they are not swollen. Resin particles having an average particle size larger than 300 nm tend to sediment, or prohibit ejection of ink. On the other hand, resin particles having an average particle size smaller than 50 nm would fail to plug pores of paper sufficiently enough to retain pigments on paper surface. The average particle size is a median cubic diameter $D_{50}$ measured on resin particles dispersed in a medium that does not swell the particles such as water by using a dynamic light-scattering particle size distribution measurement apparatus.

The content of the resin particles ranges from 0.5 to 7% by mass, preferably from 1 to 6% by mass, and more preferably from 2 to 5% by mass relative to a mass of the ink. If the content is less than the aforesaid lower limit, a satisfactory effect of plugging paper pores would not be attained. If the content is above the aforesaid upper limit, a viscosity of the ink would be too high.

The organic solvent used in the present invention may be either a non-polar organic solvent or a polar organic solvent as far as it can meet the above requirements (1) and (2) when combined with the resin particles.

When acrylic resin particles are used, preferred organic solvents are polar ones having a solubility parameter (SP) of from 17.5 MPa$^{1/2}$ to 19.5 MPa$^{1/2}$. Examples such organic solvents include alkylene glycols such as hexylene glycol, and octylene glycol; polyoxyalkylene glycols such as polyethylene glycol, and polypropylene glycol; polyoxyalkylene glycol esters such as polyethylene glycol acetate; polyoxyalkylene glycol ethers such as ethylene glycol mono(butyl) ether, ethylene glycol mono(2-ethylhexyl)ether, diethylene glycol mono(butyl)ether, diethylene glycol mono(2-ethylhexyl)ether, propylene glycol mono(butyl)ether, dipropylene glycol mono(propyl)ether, and tripropylene glycol mono (propyl)ether; polyoxyalkylene glycol ether esters such as diethylene glycol mono(butyl)ether acetate, dipropylene glycol mono(methyl)ether acetate, and dipropylene glycol mono (butyl)ether acetate; glycerin and polyglycerin such as diglycerin, triglycerin, tetraglycerin, hexaglycerin, and decaglycerin; and imidazolidinone type solvent.

Among these solvents, preferred solvents are the polyoxyalkylene glycol ethers represented by the following formula (1):

(1)

wherein R$^1$ is an alkyl group having 1 to 8 carbon atoms, A$^1$ is an alkylene group having 2 to 4 carbon atoms, and a is an integer of from 1 to 3.

Other preferred solvents are the polyoxyalkylene glycol ether esters represented by the following formula (2):

(2)

wherein R$^2$ is an alkyl group having 1 to 3 carbon atoms, R$^3$ is an alkyl group having 1 to 8 carbon atoms, A$^2$ is an alkylene group having 2 to 4 carbon atoms, and b is an integer of from 1 to 3.

From the standpoint of safety within a printer, the organic solvents having a boiling point of 200° C. of higher at 760 mm Hg are more preferred. Examples of such solvents include polyoxyalkylene glycol ether esters such as diethylene glycol mono(butyl)ether acetate, and dipropylene glycol mono(methyl)ether acetate; and polyoxyalkylene glycol ethers such as dipropylene glycol n-butyl ether, and triethylene glycol mono(butyl)ether.

In combination with the above solvents, a non-polar solvent can be used. Examples of the non-polar solvents include aliphatic hydrocarbon solvents, alicyclic hydrocarbon solvents and aromatic hydrocarbon solvents. Examples of the aliphatic hydrocarbon solvents and alicyclic hydrocarbon solvents include paraffin solvents, isoparaffin solvents, and naphthenic solvents, for example, those sold under the following trade names of Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Gas Exploration Co., and Isopar G, Isopar H, Isopar L, Isopar M, Exxsol D40, Exxsol D80, Exxsol D100, Exxsol D130 and Exxsol D140, all manufactured by Exxon Mobil Corporation. Examples of the aromatic hydrocarbon solvents include Nisseki Cleansol G, alkylbenzene manufactured by JX Nippon Oil & Gas Exploration Co., and Solvesso 200 manufactured by Exxon Mobil Corporation.

Other polar solvents than the aforesaid polar solvents can also be used in combination with the aforesaid polar solvents. Examples of the polar solvents include ester solvents, alcoholic solvents, higher fatty acid solvent, and ether solvents. Examples of the ester solvent include methyl laurate, isopropyl laurate, hexyl laurate, isopropyl myristate, isopropyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate. Examples of the alcohol solvent include isomyristyl alcohol, isopalmityl alcohol, isostearyl alcohol and oleyl alcohol. Examples of the higher fatty acid solvents include isononanoic acid, isomyristic acid, hexadecanoic acid, isopalmitic acid, oleic acid and isostearic acid. Examples of the ether solvents include diethylene glycol monobutyl ether, ethylene glycol monobutyl ether, propylene glycol monobutyl ether and propylene glycol dibutyl ether. A mixture of two or more of these solvents can be used.

In the present ink, any pigment can be used. Examples of pigment include organic pigments, for example, azo-based pigments, phthalocyanine-based pigments, dye-based pigments, condensed polycyclic pigments, nitro-based pigments and nitroso-based pigments such as brilliant carmine 6B, lake red C, Watchung red, disazo yellow, Hansa yellow, phthalocyanine blue, phthalocyanine green, alkali blue, and aniline black; inorganic pigments, for example, oxides or sulfides of metals such as cobalt, iron, chrome, copper, zinc, lead, titanium, vanadium, manganese and nickel, yellow ocher, ultramarine, and iron blue pigments; and carbon black such as furnace carbon black, lamp black, acetylene black, or channel black. Combination of two or more of these pigments can be used.

From the viewpoints of dispersibility and storage stability, the average particle size of the pigment is preferably not larger than 300 nm, more preferably not larger than 150 nm, and most preferably not larger than 100 nm. The average particle size can be measured using a dynamic light-scattering particle size distribution measurement apparatus.

The pigment is contained in the ink usually in an amount of from 0.01 to 20% by mass, preferably of from 1 to 15% by mass, and most preferably from 5 to 10% by mass from the viewpoints of printing images density and ink viscosity.

As the pigment dispersant, various kinds of dispersants can be used. Examples of the pigment dispersant include hydroxyl group-containing carboxylic acid esters, salts of long-chain polyaminoamides and high-molecular weight acid esters, salts of high-molecular weight polycarboxylic acids, salts of long-chain polyaminoamides and polar acid esters, high-molecular weight unsaturated acid esters, modified polyurethanes, modified polyacrylates, polyether ester anionic surfactants, naphthalenesulfonic acid-formalin condensate salts, polyoxyethylene alkyl phosphate esters, polyoxyethylene nonylphenyl ethers, polyester polyamines, and stearyl amine acetate.

Among these dispersants, polymer dispersants are preferred. Examples of the polymer dispersants include commercially available polymer dispersants such as Solsperse 5000 (phthalocyanine ammonium salt type), 11200 (polyamide type), 13940 (polyester amine type), 17000, 18000 (aliphatic amine type), 22000, 24000, and 28000, all available from Lubrizol Japan Ltd.; Efka 400, 401, 402, 403, 450, 451, 453 (modified polyacrylate), 46, 47, 48, 49, 4010, and 4055 (modified polyurethane), all available from Efka CHEMICALS; Demor P, EP, Poiz 520, 521, 530, and Homogenol L-18 (high molecular weight polycarboxylic acid surfactant), all available from KAO CORPORATION; Disparlon KS-860, KS-873N4 (amine salt of high molecular weight polyester), both available from Kusumoto Chemicals Ltd.; Discol 202, 206, OA-202, and OA-600 (multi-chain high molecular weight nonionic surfactant), all available from DAI-ICHI KOGYO SEIYAKU CO., LTD; and ANTARON V216 (vinyl-pyrrolidone/hexadecene copolymer) available from ISP Japan Co. Ltd., among which polyamide type and vinyl-pyrrolidone/hexadecene copolymer are preferred.

The pigment dispersant is contained in the ink in an amount enough to achieve thorough dispersion of the pigment in the ink. Usually, the content of the pigment dispersant is such that a mass ratio of the pigment dispersant as solid to the pigment ranges from about 0.1 to 2, preferably from about 0.3 to 1.0.

In addition to the aforesaid components, the present ink can comprise a conventionally used additive in such an amount that it does not adversely affect the ink. Examples of the additive include antioxidants such as dibutylhydroxytoluene, propyl gallate, tocopherol, butylhydroxyanisole, and nordihydroguaiaretic acid.

The oily ink of the present invention can be prepared by preparing separately a dispersion of a pigment and a dispersion of resin particles by dispersing a pigment in a part of the organic solvent with a means of mixing such as a mill, and by dispersing resin particles in a part of the organic solvent, and then mixing the both dispersions and the rest of the organic solvent followed by filtering the mixture with a filter means such as a membrane filter to remove solid substance, if any. The mixing can be performed by any known mixing means such as a mixer and an ultrasonic apparatus. Preferably, the mixture is left standing at room temperature for 1 to 6 hours to allow the resin particles to swell. Alternatively, the dispersion of resin particles may be mixed with the dispersion of the pigment after it has been left standing to allow the resin particles to swell.

The ink thus obtained has a viscosity ranging preferably from 7 mPa·s to 20 mPa·s, and more preferably from 8 mPa·s to 15 mPa·s. The viscosity is measured according to the method described above.

The oily ink is suitable for inkjet printing. An inkjet recording apparatus may be a piezo system, or a thermal system, and the piezo system is preferred.

Using the aforesaid oily ink of the present invention alone can form dense images, but the oily ink is suitable for forming dense black images of so-called composite black, too. Thus, another aspect of the present invention is a method of inkjet printing comprising the steps of (I) ejecting one of the following oily ink (A) and oily ink (B):
  the oily ink (A) according to the aforesaid present invention,
  an oily ink (B) consisting of a pigment, a pigment dispersant, and an organic solvent,
  wherein one of the oily ink (A) and the oily ink (B) comprises a black pigment and the other comprises a color pigment; and (II) ejecting the other oily ink so as to overprint an image produced in the step (I).

The color pigment is cyan, magenta, or yellow pigment. Any pigment can be incorporated in the oily ink (A), but preferably black pigment, more preferably carbon black, is incorporated in the oily ink (A), and a color pigment is incorporated in the other. As the pigment dispersant in the oily ink (B), any of the pigment dispersant mentioned above for the oily ink (A) can be used.

The oily ink (B) may contain an organic solvent which is the same as or different from the organic solvent contained in the oily ink (A). Preferably, an organic solvent having a SP smaller than $17.5 \text{ MPa}^{1/2}$ is used. Examples of such solvent include organic solvents having a SP smaller than $17.5 \text{ MPa}^{1/2}$ among aforesaid aliphatic hydrocarbon solvents, alicyclic hydrocarbon solvents, and aromatic hydrocarbon solvents, for example, Nisseki Isosol 400, and AF-4, both manufactured by JX Nippon Oil & Gas Exploration Co., and organic solvents having a SP smaller than $17.5 \text{ MPa}^{1/2}$ among aforesaid ester solvents, alcoholic solvents, higher fatty acid solvent, and ether solvents, for example, methyl oleate, methyl linolate, oleyl alcohol, and isostearic acid.

The step (II) is not necessarily performed after the step (I), and the both steps can be performed simultaneously using tandemly arrayed black ink head and color ink head.

EXAMPLES

The present invention will be explained with reference to the examples described below, although the present invention is in no way limited by these examples. In the following, "part" means "part by mass" unless otherwise specified.

<Preparation of Ink>

Oily inks were prepared according to the formulations 1 to 11 shown in Table 1. A dispersion of a pigment was prepared by placing, in a glass container, 8 parts of a pigment, 8 parts of a pigment dispersant as it is, 16 parts of an organic solvent, and zirconia beads (diameter: 0.5 mm), and then shaking the container using a rocking mill (Model RM05S, ex Seiwa Technical Lab Co., Ltd.) at 65 Hz for 120 minutes.

A dispersion of resin particles was prepared by mixing resin particles and an organic solvent using an ultrasonic disperser for 2 minutes except in the comparative formulation 6, ink (B) formulations 10 and 11.

The pigment dispersion obtained, the resin particle dispersion except in the formulations 6, 10, and 11, and the rest of the organic solvent were mixed by stirring and then filtered using 3.0-µm pore size membrane filter.

TABLE 1

| | Component | | SP $(MPa^{1/2})$ | Ink formulation | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| Pigment dispersion | Pigment | Carbon black | | 8 | 8 | 8 | 8 | | 8 | 8 | 8 | 8 | | |
| | | Cyan pigment | | | | | | 8 | | | | | 8 | 8 |
| | Pigment dispersant | S39000 | | 8 | 8 | 8 | 8 | 8 | 8 | 8 | | 8 | | |
| | | S13940 | | | | | | | | | 8 | | 8 | 8 |
| | Organic solvent | BDGAC | 18.2 | 16 | 16 | 16 | 16 | 16 | 16 | 16 | | 16 | | |
| | | M-OL | 17.1 | | | | | | | | 16 | | | |
| | | Isosol 400 | 15.5 | | | | | | | | | | 16 | 16 |
| Resin particle dispersion | Acrylic | MG15 | | 3 | | | 3 | 3 | | | 3 | | | |
| | Styrene/acrylic | MG161 | | | 2 | | | | | | | 2 | | |
| | Methyl methacrylate | XX-2059 | | | | 5 | | | | | | | | |
| | Comparative acrylic | FS102 | | | | | | | | 3 | | | | |
| | Organic solvent | BDGAC | 18.2 | 27 | 18 | | | 27 | | 27 | | | | |
| | | DPNB | 19.3 | | | 45 | | | | | | | | |
| | | DPMA | 17.8 | | | | 27 | | | | | | | |
| | | Cyclohexanone | 20.3 | | | | | | | | | 18 | | |
| | | M-OL | 17.1 | | | | | | | | 27 | | | |
| | | Isosol 400 | 15.5 | | | | | | | | | | | |
| Organic solvent | | BDGAC | 18.2 | 38 | 48 | | | 38 | 68 | 38 | | | | |
| | | DPNB | 19.3 | | | 18 | | | | | | | | |
| | | DPMA | 17.8 | | | | 38 | | | | | | | |
| | | Cyclohexanone | 20.3 | | | | | | | | | 48 | | |
| | | M-OL | 17.1 | | | | | | | | 38 | | 68 | |
| | | Isosol 400 | 15.5 | | | | | | | | | | | 68 |
| Total | | | | 100 | 100 | 100 | 100 | 100 | 100 | 100 | 100 | 100 | 100 | 100 |
| Light transmittance(%) | | | | 55 | 36 | 67 | 45 | 55 | 92 | 90 | 13 | 75 | 92 | 92 |
| Viscosity ratio | | | | 2.6 | 2.8 | 1.6 | 2.6 | 2.6 | 1 | 50 | 11 | 2.8 | 1 | 1 |

Details of the components shown in Table 1 are as follows:
Black pigment: MA7, ex Mitsubishi Chemical Co.
Cyan pigment: copper phthalocyanine, ex DIC Co.
Pigment dispersant 1: Solsperse S39000 having a solid content of 100%, ex Lubrizol Co.
Pigment dispersant 2: Solsperse S13940 having a solid content of 40%, ex Lubrizol Co.
BDGAC: Diethylene glycol mono(butyl)ether acetate, ex Daicel Corp.
DPMA: Dipropylene glycol methyl ether acetate, ex Daicel Corp.
DPNB: Dipropylene glycol n-butyl ether, ex Daicel Corp.
Isosol 400: Isoparaffin solvent, ex JX Nippon Oil & Gas Exploration Co.
M-OL: Methyl oleate, ex Kao Co.
Acrylic resin particle: Fine Sphere MG151, crosslinked type resin particle having a particle size ($D_{50}$) of 70 nm, ex Nipponpaint Co.
Styrene/Acrylic resin particle: Fine Sphere MG161, crosslinked type resin particle having a particle size ($D_{50}$) of 100 nm, ex Nipponpaint Co.
Methyl methacrylate resin particle: Techpolymer XX-2059 having a particle size ($D_{50}$) of 120 nm, ex Sekisui Plastic Co.
Comparative acrylic resin particle: Fine Sphere FS102, non-crosslinked type resin particle having a particle size ($D_{50}$) of 80 nm, ex Nipponpaint Co.

<Evaluation of Printed Images>

A piezo-type inkjet head manufactured by Toshiba TEC Co. was filled with the prepared ink. In single color printing, a solid image was printed on plain paper (Riso lightweight paper, ex Riso Kagaku Co.) in single pass.

In two-color overlay printing in examples 6 to 8, comparative examples 6 and 7, a solid image was printed in single pass in such a manner that ink dots ejected from a second ink-ejection route or head overlapped with ink dots ejected from a first ink-ejection route or head.

The printing was performed under the printing conditions of 42 µl per dot and 300 dpi×300 dpi resolution. Solid images obtained were left standing for 24 hours followed by measurement for optical densities of the front and back sides of the images using a Macbeth reflective densitometer, and rated according to the criteria shown in Table 2. Results are as shown in Table 4.

TABLE 2

| Rating | Image density (OD value) | Strike-through (OD value) |
|---|---|---|
| A | above 1.20 | below 0.20 |
| B | above 1.10 and 1.20 or lower | 0.20 or higher and below 0.25 |
| C | above 1.05 and 1.10 or lower | 0.25 or higher and below 0.30 |
| D | 1.05 or lower | 0.30 or higher |

<Evaluation of Ink Ejection Property>

Solid images were printed on matte paper (Riso lightweight paper, ex Riso Kagaku Co.) in the similar manner as described above. The images were visually observed for any defects caused by failed or improper ejection of ink, and rated according to the following criteria. Results are as shown in Table 4 in which the ink numbers refer to the ink formulation numbers shown in Table 1.

TABLE 3

| Rating | Ejection property |
|---|---|
| A | No failed or improper ejection observed |
| B | Failed or improper ejection observed |

TABLE 4

|  | I | II | Ejection property | Image density | Strike-through |
|---|---|---|---|---|---|
| Example 1 | Ink 1 | — | A | B | A |
| Example 2 | Ink 2 | — | A | B | A |
| Example 3 | Ink 3 | — | A | B | B |
| Example 4 | Ink 4 | — | A | B | A |
| Example 5 | Ink 5 | — | A | B | A |
| Comparative Example 1 | Ink 6 | — | A | D | D |
| Comparative Example 2 | Ink 7 | — | B | C | B |
| Comparative Example 3 | Ink 8 | — | B | C | B |
| Comparative Example 4 | Ink 9 | — | A | D | C |
| Referential Example | Ink 10 | — | A | D | D |
| Referential Example | Ink 11 | — | A | D | D |
| Example 6 | Ink 1 | Ink 10 | A | A | B |
| Example 7 | Ink 2 | Ink 11 | A | A | A |
| Example 8 | Ink 11 | Ink 3 | A | A | A |
| Comparative Example 6 | Ink 7 | Ink 10 | B | C | C |
| Comparative Example 7 | Ink 9 | Ink 10 | A | C | C |

As shown in Table 4, significant strike-through was observed in the ink of comparative example 1 lacking rein particle, and the ink of comparative example 4 in which resin particles were not swollen or insufficiently swollen even if swollen. The ink of comparative example 2 in which resin particles were dissolved, and the ink of comparative example 3 in which resin particles were over swollen showed poorer ejection property, and lower image density though they showed little strike-through. In contrast, the inks of examples 1 to 5 formed dense images, showing no or little strike-through. These inks formed denser images in the overlay printing with the ink (B) as observed in examples 6 to 8.

INDUSTRIAL APPLICABILITY

Inkjet printing with the oily ink according to the present invention provide dense printed images without strike-through.

It should be noted that, besides those already mentioned above, various modifications and variations can be made in the aforementioned embodiments without departing from the novel and advantageous features of the present invention. Accordingly, it is intended that all such modifications and variations are included within the scope of the appended claims.

The invention claimed is:

1. An oily ink comprising a pigment, a pigment dispersant, and an organic solvent, the oily ink further comprising 0.5 to 7% by mass, relative to a mass of the oily ink, of resin particles, which are swollen by the organic solvent, wherein
  (1) a dispersion of 1% by mass of the resin particles in an equilibrium state of swelling in the organic solvent has an optical transmittance at 700 nm ranging from 20 to 70%, and
  (2) a dispersion of 10% by mass of the resin particles in an equilibrium state of swelling in the organic solvent has such a viscosity that a ratio of the viscosity to a viscosity of the organic solvent ranging from 1.5 to 5.0.

2. The oily ink according to claim 1, wherein the resin particles comprises a crosslinked acrylic resin or a styrene/acrylic copolymer resin.

3. The oily ink according to claim 1, wherein the organic solvent is at least one selected from the group consisting of polyoxyalkylene glycols, polyoxyalkylene glycol esters, polyoxyalkylene glycol ethers, and polyoxyalkylene glycol ether esters.

4. A method of inkjet printing comprising the steps of
  (I) ejecting one of the following oily ink (A) and oily ink (B):
    the oily ink (A) according to claim 1,
    an oily ink (B) consisting of a pigment, a pigment dispersant, and an organic solvent,
    wherein one of the oily ink (A) and the oily ink (B) comprises a black pigment and the other comprises a color pigment; and
  (II) ejecting the other oily ink so as to overprint an image produced in the step (I).

5. The method of inkjet printing according to claim 4, wherein the organic solvent in the oily ink (B) is at least one selected from the group consisting of isoparaffin solvents and ester solvents having a solubility parameter (SP) smaller than 17.5 MPa$^{1/2}$.

* * * * *